(12) United States Patent
Menheere et al.

(10) Patent No.: US 11,060,457 B2
(45) Date of Patent: Jul. 13, 2021

(54) COOLING SYSTEM AND METHOD FOR GAS TURBINE ENGINE

(71) Applicant: PRATT & WHITNEY CANADA CORP., Longueuil (CA)

(72) Inventors: David Menheere, Norval (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 797 days.

(21) Appl. No.: 15/367,450

(22) Filed: Dec. 2, 2016

(65) Prior Publication Data

US 2018/0156120 A1    Jun. 7, 2018

(51) Int. Cl.
| | |
|---|---|
| *F02C 7/18* | (2006.01) |
| *F02C 7/14* | (2006.01) |
| *F28D 15/02* | (2006.01) |
| *B64D 33/08* | (2006.01) |
| *F02K 3/06* | (2006.01) |

(52) U.S. Cl.
CPC .............. *F02C 7/185* (2013.01); *B64D 33/08* (2013.01); *F02C 7/14* (2013.01); *F28D 15/02* (2013.01); *F28D 15/0266* (2013.01); *F02K 3/06* (2013.01); *F05D 2260/207* (2013.01); *F05D 2260/213* (2013.01)

(58) Field of Classification Search
CPC ...... F02C 7/12; F02C 7/14; F02C 7/18; F02C 7/185; F05D 2260/205; F05D 2260/207; F05D 2260/213; F01D 25/12; F01D 25/125; F02K 3/115; F28D 15/02; F28D 15/0266

See application file for complete search history.

(56) References Cited

U.S. PATENT DOCUMENTS

| | | | | |
|---|---|---|---|---|
| 4,601,202 A | * | 7/1986 | Colman | ................. F01D 17/02 361/703 |
| 5,203,399 A | * | 4/1993 | Koizumi | ............... F25B 23/006 165/104.22 |
| 6,931,834 B2 | * | 8/2005 | Jones | ...................... F28D 15/02 257/E23.088 |
| 6,990,797 B2 | * | 1/2006 | Venkataramani | ....... F02C 7/047 244/134 R |

(Continued)

*Primary Examiner* — Alain Chau
(74) *Attorney, Agent, or Firm* — Norton Rose Fulbright Canada LLP (57) ABSTRACT

A cooling system for a gas turbine engine comprising a closed circuit containing a change-phase fluid, the closed circuit having at least one cooling exchanger configured to be exposed to a flow of cooling air for the change-phase fluid to release heat to the cooling air. A plurality of heat exchangers in are heat exchange relation with the change-phase fluid in the closed circuit, the plurality including at least a first heat exchanger configured to receive a first coolant from a first engine system for the change-phase fluid to absorb heat from the first coolant, and a second heat exchanger configured to receive a second coolant from a second engine system for the change-phase fluid to absorb heat from the second coolant. The system is configured so that the fluid at least partially vaporizes when absorbing heat from at least one of the first coolant and the second coolant and at least partially condenses when releasing heat to the cooling air. A method for cooling engine systems of a gas turbine engine is also provided.

20 Claims, 7 Drawing Sheets

(56) References Cited

U.S. PATENT DOCUMENTS

| | | | | |
|---|---|---|---|---|
| 7,213,391 B2* | 5/2007 | Jones | ................ | F28D 15/02 |
| | | | | 257/E23.088 |
| 7,530,231 B2* | 5/2009 | Prociw | ................ | F02C 7/14 |
| | | | | 165/104.26 |
| 7,748,211 B2* | 7/2010 | Norris | ................ | F02C 7/18 |
| | | | | 60/247 |
| 7,823,374 B2* | 11/2010 | Venkataramani | ........ | F02C 7/047 |
| | | | | 60/39.093 |
| 7,908,840 B2 | 3/2011 | Schwarz et al. | | |
| 7,908,874 B2* | 3/2011 | Weber | ................ | F28F 23/00 |
| | | | | 62/119 |
| 7,941,993 B2 | 5/2011 | Siebert | | |
| 8,157,503 B2 | 4/2012 | Junod | | |
| 8,205,426 B2* | 6/2012 | Schilling | ................ | F02K 3/06 |
| | | | | 60/39.08 |
| 8,387,362 B2* | 3/2013 | Storage | ................ | F28F 1/022 |
| | | | | 60/266 |
| 8,499,822 B2* | 8/2013 | Bulin | ................ | F02C 7/224 |
| | | | | 165/51 |
| 9,422,063 B2* | 8/2016 | Diaz | ................ | B64D 33/10 |
| 10,082,078 B2* | 9/2018 | Snape | ................ | F02C 7/14 |
| 10,233,841 B2* | 3/2019 | Bintz | ................ | F02C 7/14 |
| 10,294,822 B2* | 5/2019 | Caruel | ................ | F02K 3/06 |
| 10,371,052 B2* | 8/2019 | Xu | ................ | F02C 7/36 |
| 10,539,076 B2* | 1/2020 | Niergarth | ................ | F02C 7/185 |
| 2004/0020213 A1* | 2/2004 | Jones | ................ | F28D 15/02 |
| | | | | 60/772 |
| 2005/0050877 A1* | 3/2005 | Venkataramani | ....... | F02C 7/047 |
| | | | | 60/39.093 |
| 2007/0022732 A1* | 2/2007 | Holloway | ................ | F02C 7/14 |
| | | | | 60/39.08 |
| 2007/0044451 A1* | 3/2007 | Jones | ................ | F28D 15/0266 |
| | | | | 60/226.1 |
| 2007/0234704 A1* | 10/2007 | Moniz | ................ | F01D 25/02 |
| | | | | 60/39.093 |
| 2008/0053100 A1* | 3/2008 | Venkataramani | ........ | F02C 7/14 |
| | | | | 60/772 |
| 2008/0095611 A1* | 4/2008 | Storage | ................ | F02C 7/14 |
| | | | | 415/116 |
| 2008/0141954 A1* | 6/2008 | Norris | ................ | F02C 7/18 |
| | | | | 123/41.21 |
| 2010/0107603 A1* | 5/2010 | Smith | ................ | F02C 7/14 |
| | | | | 60/267 |
| 2010/0212857 A1* | 8/2010 | Bulin | ................ | F02C 7/14 |
| | | | | 165/41 |
| 2011/0100020 A1* | 5/2011 | Zhang | ................ | F01D 5/185 |
| | | | | 60/806 |
| 2014/0352315 A1* | 12/2014 | Diaz | ................ | F02C 3/04 |
| | | | | 60/772 |
| 2014/0369812 A1* | 12/2014 | Caruel | ................ | F02K 3/06 |
| | | | | 415/116 |
| 2015/0377130 A1* | 12/2015 | Xu | ................ | F02C 7/047 |
| | | | | 60/779 |
| 2016/0280387 A1* | 9/2016 | Snape | ................ | F02C 7/14 |
| 2016/0318619 A1* | 11/2016 | Diaz | ................ | B64D 33/10 |
| 2017/0130606 A1* | 5/2017 | Niergarth | ................ | F02C 7/185 |

\* cited by examiner

COOLING SYSTEM AND METHOD FOR GAS TURBINE ENGINE

TECHNICAL FIELD

The application relates generally to gas turbine engines and, more particularly, to a cooling system of a gas turbine engine.

BACKGROUND OF THE ART

Due to heat generated in the operation of gas turbine engines, various methods and system have been developed for rejecting heat of engine systems such as the auxiliary gearbox, the integrated drive generator, etc. Heat may be rejected to available cooling air, such as air circulating in the bypass duct. Accordingly, heat exchangers may project into the bypass duct, but may hence affect air flow and cause vibration of the fan. It is also known to position coils of cooling oil near or at the surface of the bypass duct, bringing flammable fluids near the stream of bypass air.

SUMMARY

In one aspect, there is provided a cooling system for a gas turbine engine comprising: a closed circuit containing a change-phase fluid, the closed circuit having at least one cooling exchanger configured to be exposed to a flow of cooling air for the change-phase fluid to release heat to the cooling air, and a plurality of heat exchangers in heat exchange relation with the change-phase fluid in the closed circuit, the plurality including at least a first heat exchanger configured to receive a first coolant from a first engine system for the change-phase fluid to absorb heat from the first coolant, and a second heat exchanger configured to receive a second coolant from a second engine system for the change-phase fluid to absorb heat from the second coolant, wherein the system is configured so that the fluid at least partially vaporizes when absorbing heat from at least one of the first coolant and the second coolant and at least partially condenses when releasing heat to the cooling air.

In another aspect, there is provided a method for cooling engine systems of a gas turbine engine comprising: exposing a change-phase fluid in a closed circuit to a heat exchange with a first coolant from a first engine system, exposing the change-phase fluid in the closed circuit to a heat exchange with a second coolant from at least a second engine system, and exposing the change-phase fluid in the closed circuit to a heat exchange with a flow of cooling air in a cooling exchanger, whereby the change-phase fluid at least partially vaporizes when absorbing heat from at least one of the first coolant and the second coolant, and the change-phase fluid at least partially condenses when releasing heat to the cooling air.

DESCRIPTION OF THE DRAWINGS

Reference is now made to the accompanying figures in which.

DETAILED DESCRIPTION

Figure 1:
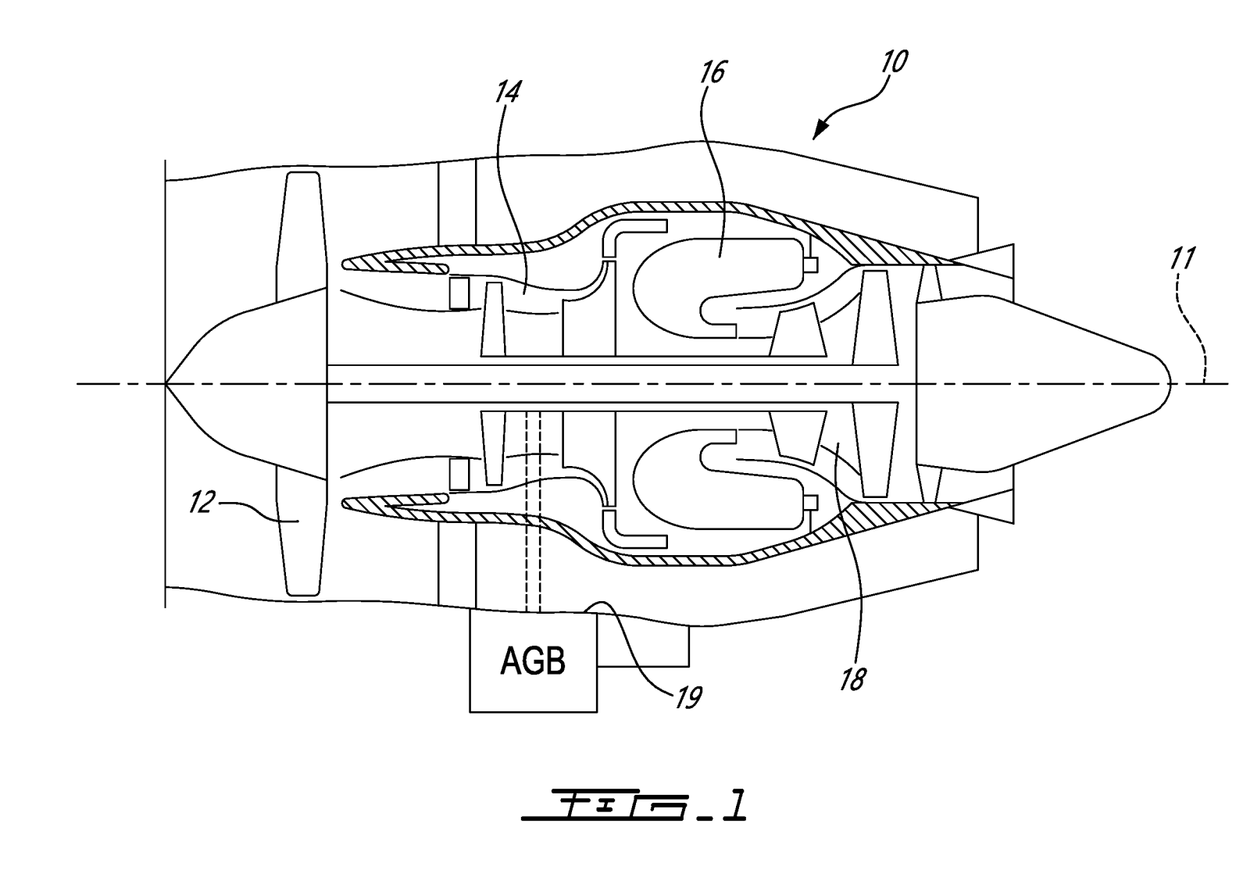
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The gas turbine engine 10 may also have a bypass duct defined by a bypass wall 19 among other surfaces. As is known, the gas turbine engine 10 may have different engine systems, such as an auxiliary gear box, and integrated drive generator that generate heat and hence may require cooling. Likewise, the gas turbine engine 10 may have an air cooled oil cooler used for cooling various engine systems, but the air cooled oil cooler must reject absorbed heat.

Figure 2:
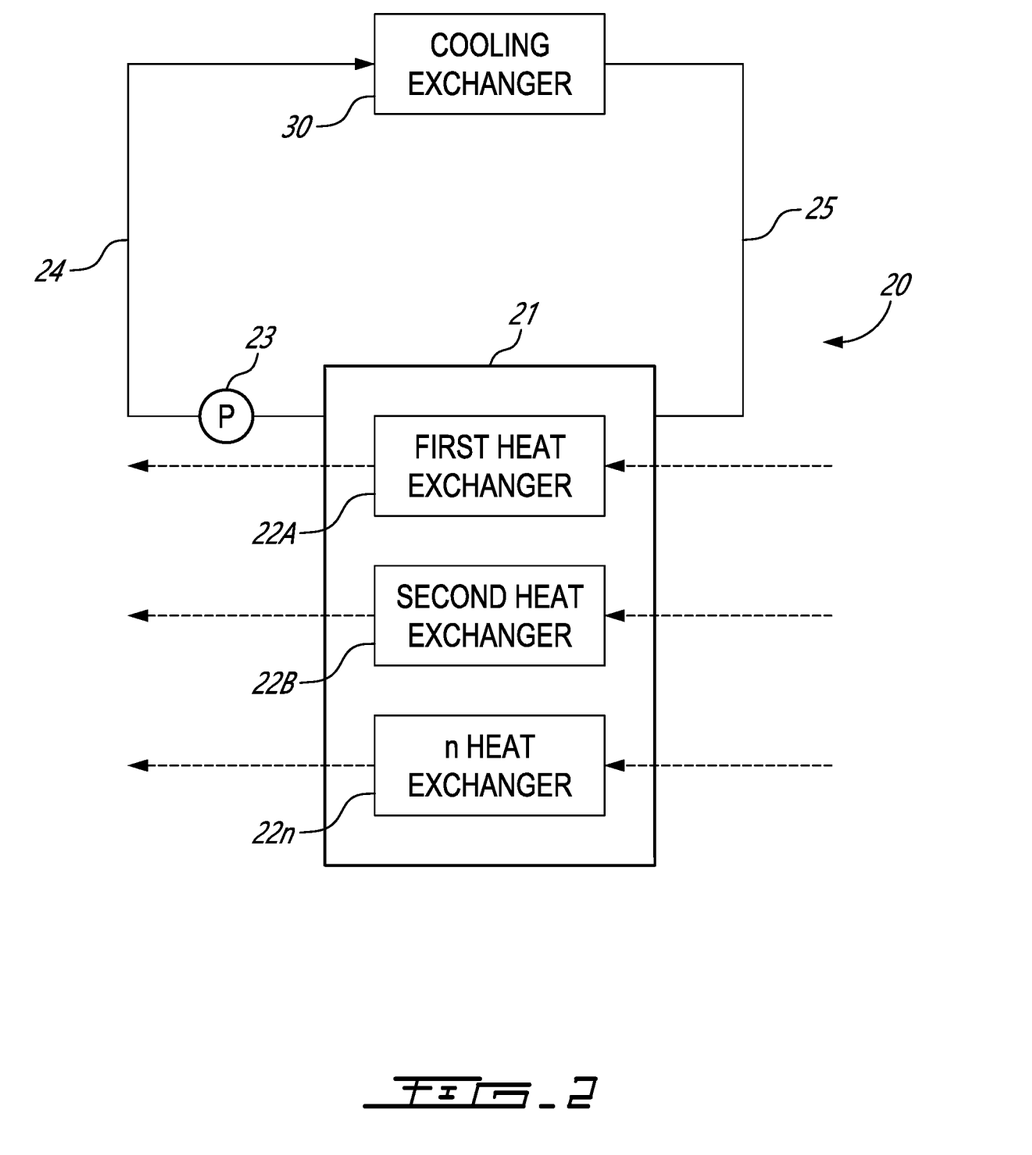
FIG. 2 is a block diagram of a cooling system for a gas turbine engine in accordance with the present disclosure.

Referring to FIG. 2, a cooling system in accordance with the present disclosure is generally shown at 20. The cooling system 20 is a closed circuit type of system, in that the fluid(s) it contains is(are) captive therein, with the exception of undesired leaks. Hence, the cooling system 20 is closed in that it allows heat exchanges as desired, but generally prevents a transfer of mass or loss of mass of the fluid(s) it contains. The cooling system 20 includes a cooling fluid, selected to be a change-phase fluid. The cooling fluid may also be known as a coolant, as a refrigerant, etc. However, for simplicity and clarity, the expression "change-phase fluid" will be used, so as not to mix it up with the coolants used in closed circuits associated with engine systems, with which the change-phase fluid will be in a heat-exchange relation. The cooling fluid is said to be a change-phase fluid in that it changes phases between liquid and vapour in a vapour-condensation cycle, in such a way that it may store latent heat and efficiently absorb heat while remaining at a same temperature during phase change. Moreover, the change-phase fluid is known to have a greater density when in a liquid phase than in a vapour phase, which results in condensate to drip by gravity while vapour rises. According to an embodiment, the change-phase fluid is water or water-based, and may include other constituents, such as glycol, salts, etc. Alternatively, other change-phase fluids, without water, may be used. In an embodiment, the change-phase fluid is non flammable. Hence, the change-phase fluid is in a gaseous and in a liquid state depending on the location in the cooling system 20, and the cooling system 20 may also include other fluids such as air.

The cooling system 20 may have one or more reservoirs 21. The reservoir 21 may be known as a receiver, a tank, etc. The reservoir 21 receives and stores the change-phase fluid, with the liquid state of the fluid in a bottom of the reservoir 21. According to an embodiment, a plurality of heat exchangers, illustrated as 22A, 22B and 22n (jointly referred to as 22) are also located in the reservoir 21, for coolants circulating in the heat exchangers 22 to be in a heat exchange relation with the fluid in the reservoir 21, i.e., in a non-mass transfer relation. Although shown schematically in FIG. 2, the heat exchangers 22 may have any appropriate configuration or surface component to enhance heat exchange, such as coils, fins, etc. Moreover, although the heat exchangers 22 are depicted as sharing a same reservoir 21, all or some of the heat exchangers 22 may have their own dedicated reservoir 21.

According to an embodiment, each heat exchanger 22 is associated with an own engine system. Stated different, each heat exchanger 22 is tasked with releasing heat from its related engine system. Hence, the heat exchangers 22 are also part of closed circuits, extending from the reservoir 21 to the engine system. The engine systems may include auxiliary gear box, and integrated drive generator. Also, one of the heat exchangers 22 may be part of an air cooled oil cooler. According to an embodiment, the heat exchangers 22 may be stacked one atop the other in the reservoir 21, with the heat exchangers 22 all bathing in the liquid state of the change-phase fluid. Therefore, coolants circulating in any one of the heat exchangers 22 may release heat to the change-phase fluid in the reservoir 21. Therefore, the change-phase fluid may boil, with vapour resulting from the heat absorption.

A pressure regulator 23 may be provided in one of the feed conduits 24, such as to regulate a pressure in the reservoir 21. The pressure regulator 23 may be any appropriate device that operates to maintains a given regulated pressure in the reservoir 21, such that vapour exiting via the feed conduits 24 is above the regulated pressure. According to an embodiment, the pressure regulator 23 is a sourceless device, in that it is not powered by an external power source, and that is set based on the planned operation parameters of the gas turbine engine 10. For example, the pressure regulator 23 may be spring operated. Alternatively, the pressure regulator 23 may be a powered device, such as a solenoid valve, for instance with associated sensors or pressure detectors. Although not shown, complementary devices, such as a check valve, may be located in return conduits 25 directing condensate to the reservoir 21. FIG. 2 shows a schematic configuration of the cooling system 20 with a single feed conduit 24 and single return conduit 25, but 24 and 25 may include networks of conduits in any appropriate arrangements, for instance as shown in embodiments described hereinafter.

Figure 3:
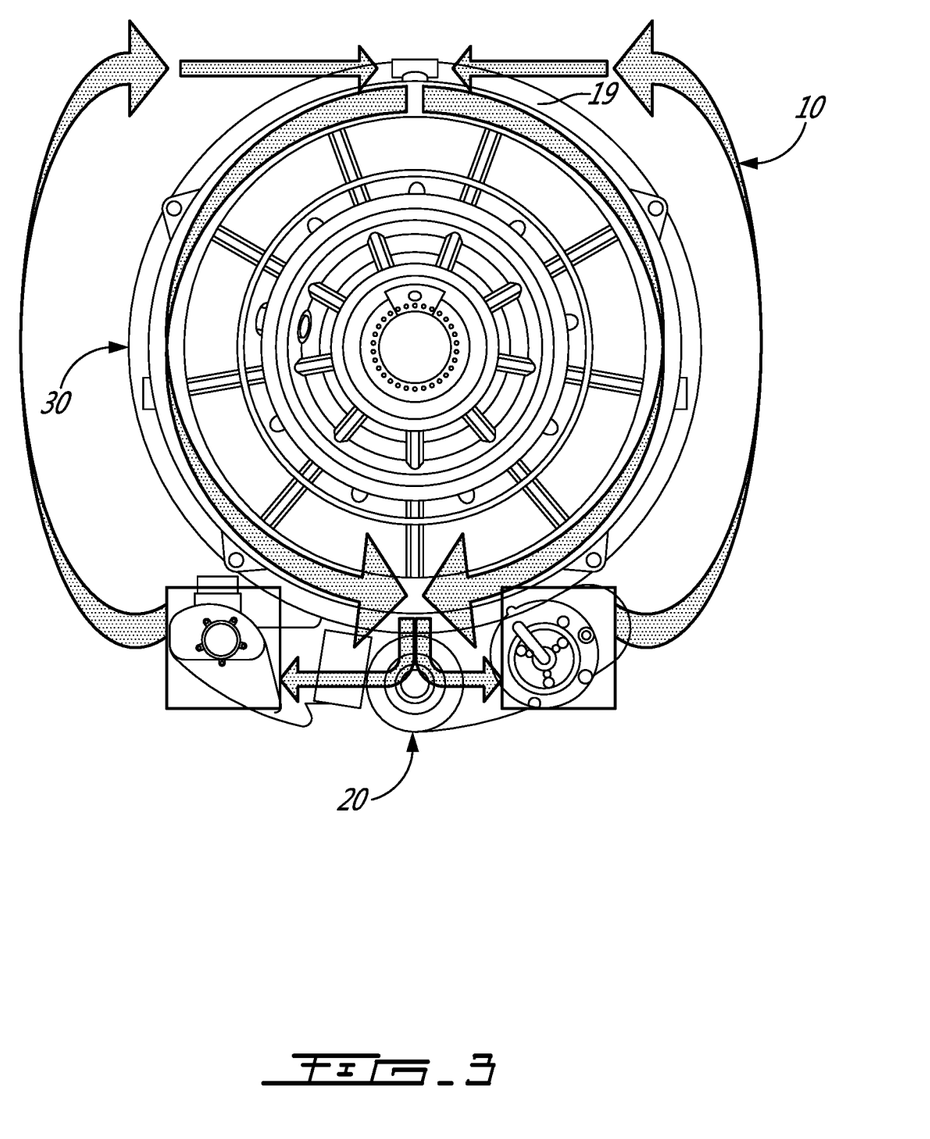
FIG. 3 is a schematic view of a vapour cycle for an embodiment of the cooling system of FIG. 2.

The vaporized change-phase fluid is directed by the conduit(s) 24 to an cooling exchanger 30 in which the cooling fluid will be exposed to a flow of cooling air, such that the vaporized fluid release its absorbed heat to the cooling air. The cooling exchanger 30 may be at any location in the gas turbine engine 10, and cooling air may be directed in any appropriate way to absorb heat from the cooling exchanger 30. As described hereinafter, according to one embodiment, the cooling exchanger 30 is part of the bypass duct, such that the cooling air is the bypass air. In rejecting heat to the cooling air, the cooling fluid may condensate. The conduits 25 are therefore arranged to direct the condensate to the reservoir 21. According to an embodiment, the cooling system 20 relies on vapour density to feed the cooling exchanger 30 and on gravity for the condensate to reach the reservoir 21, such that no motive force is required to move the cooling fluid, i.e., no powered device may be necessary. The vapour cycle of the change-phase fluid between heat absorption and heat release is generally shown in FIG. 3, in accordance with an embodiment. However, it is contemplated to provide a pump (such as one or more electric pumps) or like powered device to assist in moving the cooling fluid.

Figure 4:
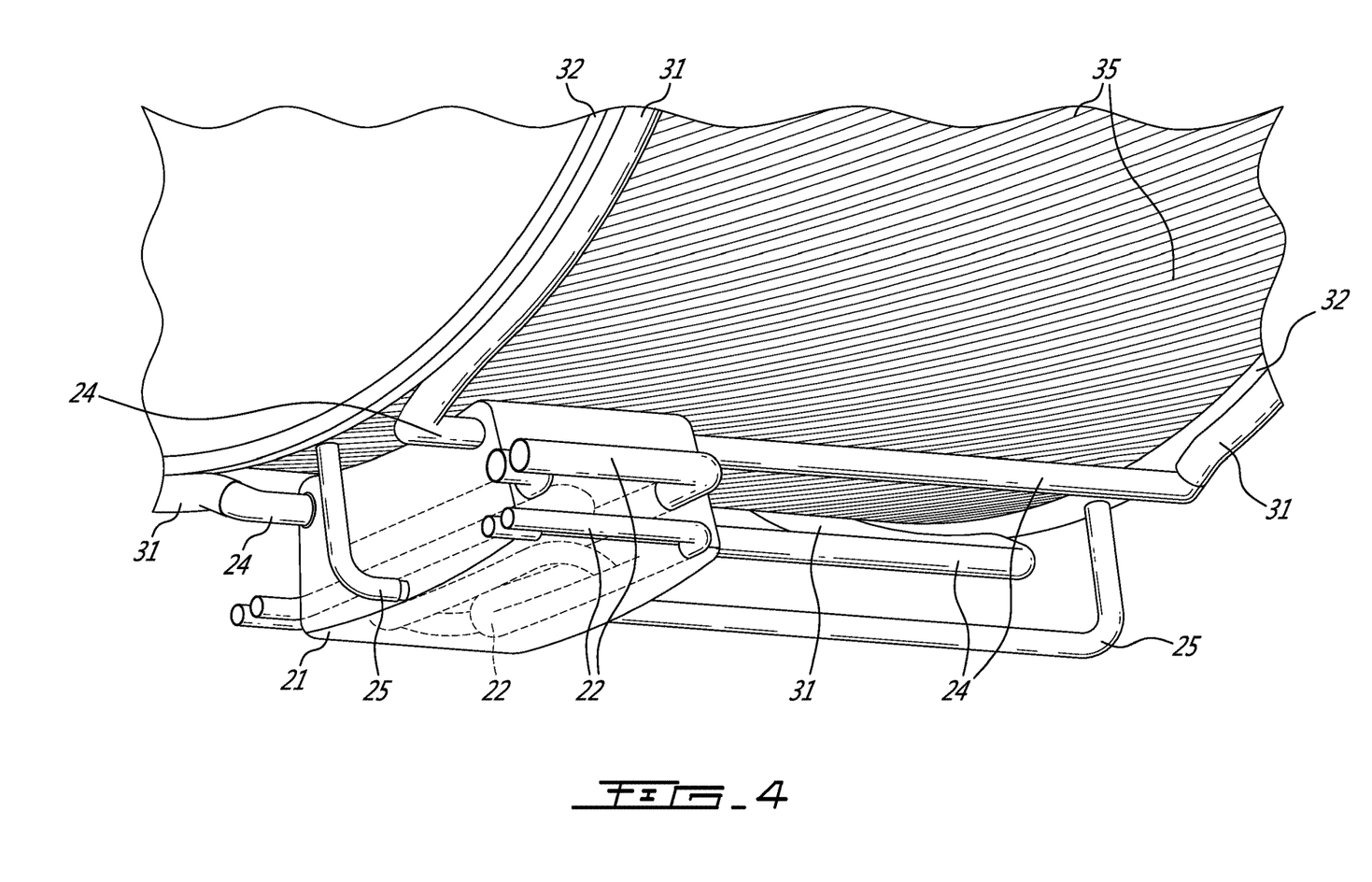
FIG. 4 is an enlarged view of a heat-absorption portion of an embodiment of the cooling system of FIG. 2.

Referring to FIG. 4, there is shown an embodiment in which the cooling exchanger 30 is part of the bypass duct wall 19. The reservoir 21 is located at a bottom of the bypass duct wall 19, for condensate to flow to the reservoir 21 by the effect of gravity. The various heat exchangers 22 are shown as being stacked, with the inlet conduit and the outlet conduit pair of each heat exchanger 22 being adjacent and on a same side of the reservoir 21, although other arrangements are possible. The feed conduits 24 are located on an upper portion of the reservoir 21 to direct vapour out of the reservoir 21, while the return conduits 25 are connected to a bottom portion of the reservoir 21 to feed condensate to the reservoir 21. By providing vapour and fluid connections at each end and on the sides of the reservoir 21 and stacking the heat exchangers 22 the effect of attitude and roll may be reduced.

Figure 5:
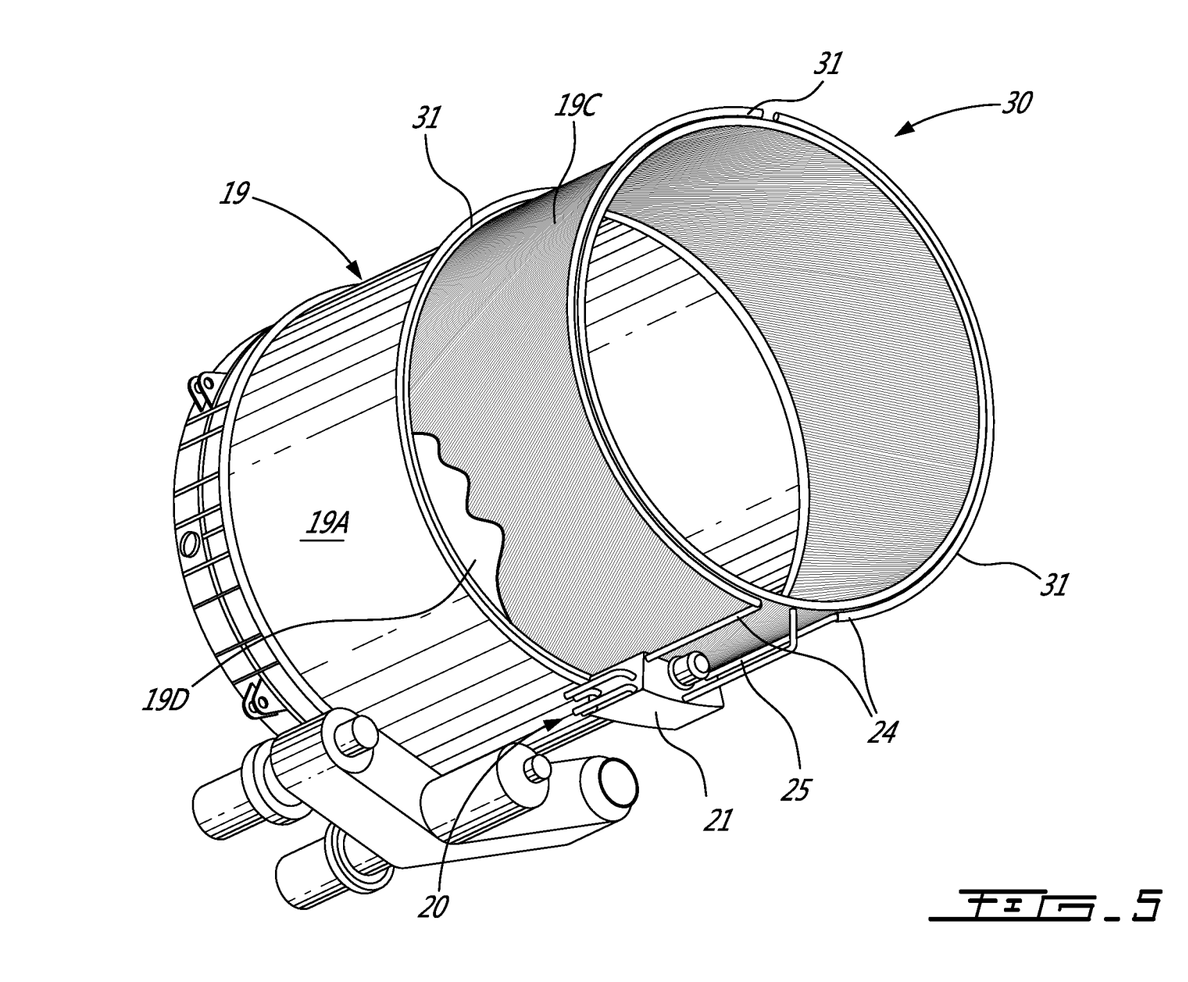
FIG. 5 is a perspective view of an embodiment of the cooling system of FIG. 2 having a cooling exchanger in a bypass duct of the gas turbine engine.

Referring to FIG. 5, the bypass duct is shown in greater detail, and may include a forward wall portion 19A and a rear wall portion 19B. The cooling system 20 may be located on the rear wall portion 19B, while the forward duct wall portion 19A may incorporate the access doors and mount points. According to an embodiment, the feed conduits 24 may include arcuate conduit segments 31 extend from straight conduit portions, to surround the bypass duct wall 19. As part of the network of conduits 24, the arcuate conduit segments 31 are tasked with directing vapour of the closed circuit toward a top of the bypass duct wall 19. Other shapes of conduit segments may be used, but the arcuate conduit segments 31 may appropriately be positioned in close proximity to the bypass duct wall 19. According to an embodiment, the ends of the arcuate conduit segments 31 are open at a top of the bypass duct wall 19, and an annular chamber is defined between the radially outer surface 19C of the bypass duct wall 19 and annular wall 19D sealingly mounted around the radially outer surface 19C. Therefore, vapor fed by the conduits 24 via the conduit segments 31 may fill the annular chamber. As the annular chamber is defined by the bypass duct wall 19, the vapour will be in heat exchange relation with the bypass duct wall 19. As the bypass duct wall 19 is continuously cooled by a flow of bypass air, the vapour may condensate. Hence, the condensate will trickle down by gravity, and accumulate at a bottom of the annular chamber, to be directed to the reservoir 21.

Figure 6:
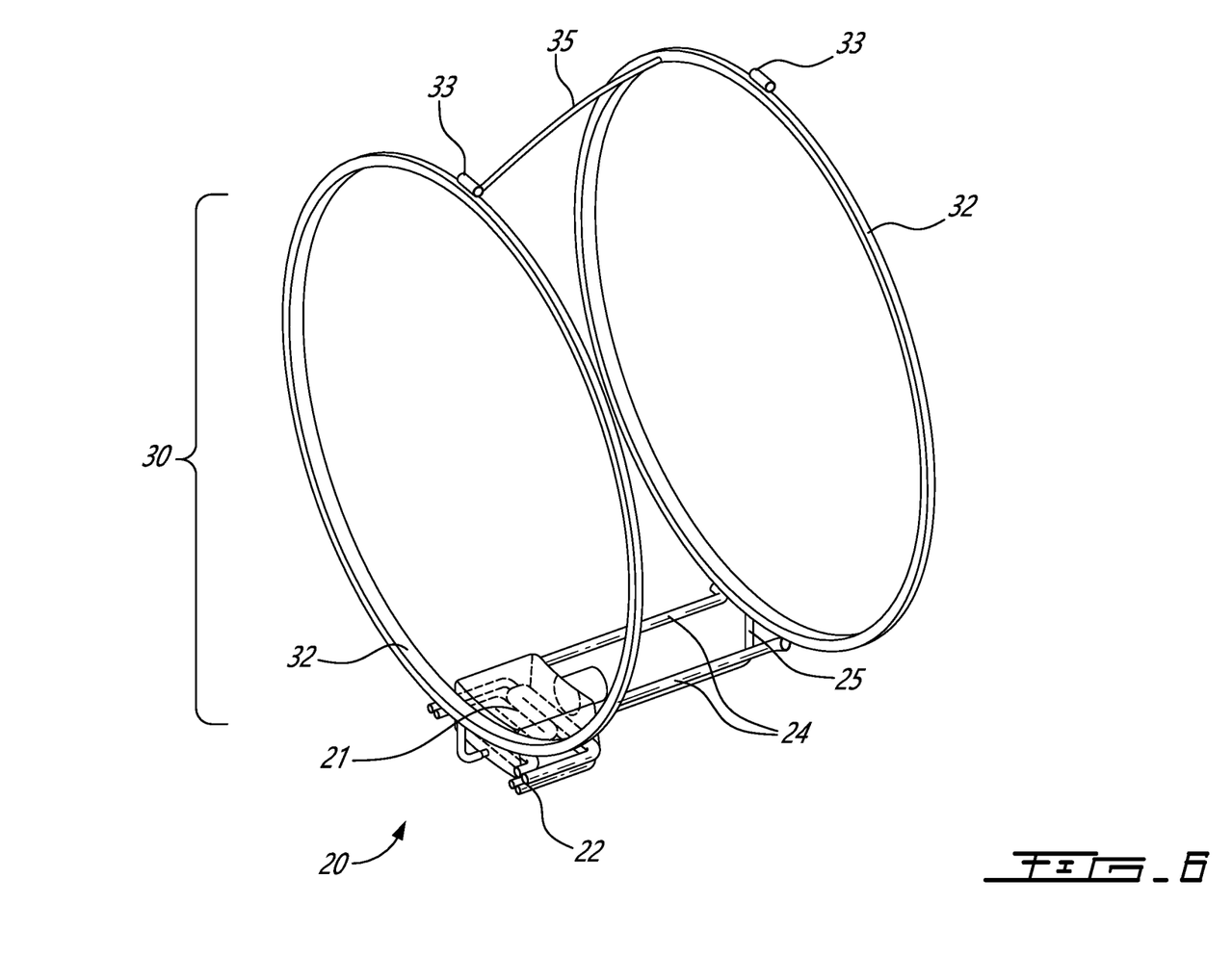
FIG. 6 is a perspective view of part of the cooling system of FIG. 5.
Figure 7:
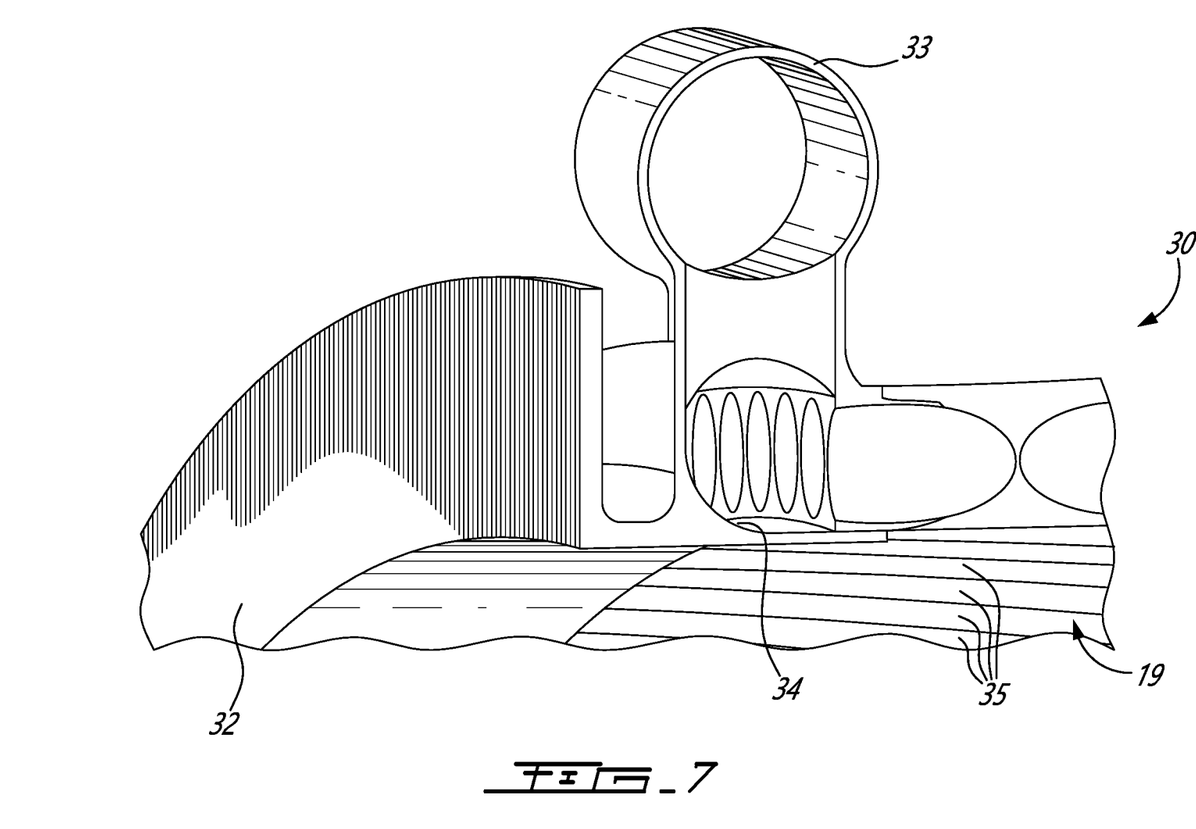
FIG. 7 is a sectioned view of components of the cooling system of FIG. 5.

Referring to FIGS. 6 and 7, in accordance with another embodiment, the cooler exchanger 30 may include one or more annular headers 32 (i.e., manifolds, annular conduits, etc). The annular headers 32 have an adaptor 33 at a top end, the adaptor 33 being for instance a tee-shaped adaptor 33 by which the top ends of the conduit segments 31 (FIG. 5) may be in fluid communication with the annular headers 32 to feed same with vapour. The adaptors 33 define a passage by which vapour is then fed to the annular cavity 34 of the annular headers 32. A plurality of pipes 35 (a.k.a, conduits, tubes) may extend from between a pair of the annular headers 32, and may be in fluid communication with the annular cavities 34 of the annular headers 32, such that the change-phase fluid may circulate freely therein. Therefore, as vapour is fed from the feed conduits 24 via the conduit segments 31, vapour reaches the annular headers 32 and flows into some of the pipes 35. The pipes 35 extend along the bypass duct wall 19, and may be in close proximity or conductive contact with it, such that the vapour circulating in the pipes 35 rejects heat to the bypass air by convection and conduction. Alternatively, the pipes 35 may define the annular surface of the duct wall 19, so as to be directly exposed to the flow of bypass air. As the pipes 35 are cooled, the vapour may condensate. As a result, the condensate flows down the pipes 35 to one of the annular headers 32, for instance depending on the attitude of the gas turbine engine 10. The annular headers 32 are in fluid communication with the return conduits 25.

Hence, the inner surface of the pipes 35 directly exposed to the bypass flow In the embodiment of FIGS. 6 and 7, the cooling system 20 uses the duct 19 to be a large area cooler. The cooling system 20 may be constructed of a large number of conduits 24 and 25 and the pipes 35 bent in the same shape and subsequently stacked in a circular pattern and brazed to the headers 32 as a single unit. The headers 32 distribute the steam to the pipes 35 which are directly or indirectly exposed to the cooling air and cause the vapour to condense and flow to the front or rear headers 32 via gravity and back to the reservoir 21 located below the bypass duct cooler 30. The sequence is repeated on a continuous basis and is a sealed system, due to the closed nature of the circuit. The rejection of the heat to the bypass air contributes to the engine overall efficiency.

The cooling system 20 is of relatively low pressure and low temperature along with the possibility of employing a non flammable cooling fluid. As observed from FIGS. 3 and 4, the reservoir 21 is centrally located, such that the oil and change-phase fluid routings are centrally located so as to be shorter. The centralizing may also result in a single area needing greater protection or shielding.

The cooling exchanger 30 of the cooling system 20 may be sized as needed for cooling. The majority of the heat to be rejected may come from sources near the central location of the reservoir 21, which may results in short tube/hose runs and minimizes the hidden oil in the system. The cooling exchanger 30, when located in or defining the bypass duct wall 19 may be structural and therefore be capable of sustaining both the mount and the thrust reverser loads.

According to an embodiment, the bypass duct has an aerodynamic profile. The pipes 35 may be bent in a pattern that forms an angle to the centreline of the engine which allows the duct of pipes 35 to be shaped to the required aerodynamic profile. The changing angle of the pipes 35 relative to the centreline of the engine produces a change in the duct diameter by virtue of the changing length in response to the angle. The assembly may be brazed as a unit. Tube diameter may be relatively large (for example, 0.5" diameter) with a thin wall (<0.010"). Although other arrangements are considered, such a combination produces a stiff structure with low weight and a large wetted surface area.

As an example of operation of the cooling system 20, the approximate heat values in a ~15,000 lb thrust turbofan engine are typically <1000 Btu/min for the integrated drive generator and <2000 Btu/min for the air cooled oil cooler, ~5000 Btu/min for the buffer air cooler. The heat of vaporization of water is 970 Btu/lb which in the present example would require ~8 lb of water/glycol mix (an example of change-phase fluid) provided the vapour could be condensed efficiently enough to refill the reservoir 21. A benefit is the automatic compensation for differential heat from the various engine systems. In an example, the various heat exchangers 22 share the same reservoir 21 and respond to each heat exchanger 22 as its own system. If one system has increased heat influx, the steam generated flows into the cooling exchanger 30 and condenses on the relative cool bypass duct wall 19 and the condensate flows back to the reservoir 21 as fluid and repeats the cycle again. Since the cooling system 20 is a closed system, its pressure can be set through the pressure regulator 23, with the trigger point adjusted to the lowest system temperature. An example, the integrated drive generator may have a specified maximum temperature of 185° F. By lowering the pressure in the reservoir 21 via the pressure regulator 23, the boiling point of the change-phase fluid can be adjusted to the required temperature. The other heat exchangers 22 in the reservoir 21 will be cooled to this temperature, which is permissible because of the large condensing area of the cooling exchanger 19. In this manner, the cooling system 20 self regulates both the temperature and thermal loads between multiple engine systems, optionally without motive forces, powered valves or powered controls, eliminating such potential failure points.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A cooling system for a gas turbine engine comprising:
a closed circuit containing a change-phase fluid, the closed circuit having at least one cooling exchanger integrated inside a bypass duct wall and around a bypass duct, the bypass duct wall being annular, the at least one cooling exchanger extending from a top portion to a bottom portion of the bypass duct wall, the at least one cooling exchanger configured to be exposed to a flow of cooling air for the change-phase fluid to release heat to the cooling air, and
a plurality of heat exchangers in heat exchange relation at the bottom portion of the bypass duct wall with the change-phase fluid in the closed circuit, the plurality of heat exchangers including at least a first heat exchanger configured to receive a first coolant from a first engine system for the change-phase fluid to absorb heat from the first coolant, and a second heat exchanger configured to receive a second coolant from a second engine system for the change-phase fluid to absorb heat from the second coolant,
wherein the system is configured so that the change-phase fluid at least partially vaporizes when absorbing heat from at least one of the first coolant and the second coolant and at least partially condenses when releasing heat to the cooling air.

2. The cooling system as defined in claim 1, further comprising a pressure regulator in the closed circuit for regulating a pressure of the change-phase fluid for the change-phase fluid to vaporize when absorbing heat from any one of the first coolant and the second coolant.

3. The cooling system as defined in claim 1, wherein the closed circuit is without motive force.

4. The cooling system as defined in claim 1, wherein the cooling exchanger is an annular chamber including the bypass duct wall.

5. The cooling system as defined in claim 1, wherein the cooling exchanger is located around the bypass duct.

6. The cooling system as defined in claim 1, wherein the closed circuit has a reservoir for the change-phase fluid, the reservoir being below the bottom portion of the bypass duct wall for the condensed change-phase fluid to be directed to the reservoir by gravity.

7. The cooling system as defined in claim 6, wherein at least the first heat exchanger and the second heat exchanger are in the reservoir.

8. The cooling system as defined in claim 7, wherein the first heat exchanger and the second heat exchanger are stacked in the reservoir.

9. The cooling system as defined in claim 8, wherein the closed circuit has at least a conduit extending from the cooling exchanger to the reservoir, the conduit connected to a side of the reservoir.

10. The cooling system as defined in claim 1, wherein the change-phase fluid is non flammable.

11. The cooling system as defined in claim 1, wherein the plurality of heat exchangers are configured to each be connected to a cooling system of a respective one of engine systems selected from a group including an auxiliary gearbox, a buffer air cooler, an air cooled oil cooler, and an integrated drive generator.

12. A method for cooling engine systems of a gas turbine engine comprising:
    exposing a change-phase fluid in a closed circuit to heat exchange with a first coolant from a first engine system,
    exposing the change-phase fluid in the closed circuit to heat exchange with a second coolant from at least a second engine system, and
    exposing the change-phase fluid in the closed circuit to heat exchange with a flow of cooling air in a cooling exchanger around a bypass duct from a top portion to a bottom portion of the bypass duct,
    whereby the change-phase fluid at least partially vaporizes when absorbing heat from at least one of the first coolant and the second coolant at the bottom portion of the bypass duct, and the change-phase fluid at least partially condenses when releasing heat to the cooling air.

13. The method as claimed in claim 12, further comprising regulating a pressure of the change-phase fluid to expose the change-phase fluid to heat exchange with the first coolant and the second coolant at a regulated pressure.

14. The method as claimed in claim 13, wherein regulating the pressure to the regulated pressure comprises regulating the pressure as a function of a lowest system pressure among the engine systems.

15. The method as claimed in claim 12, wherein the method is performed without motive force.

16. The method as claimed in claim 12, wherein exposing the change-phase fluid to heat exchange with the flow of cooling air comprises directing vaporized change-phase fluid around the bypass duct.

17. The method as claimed in claim 16, wherein exposing the change-phase fluid to heat exchange with the first coolant and the second coolant comprises collecting condensed change-phase fluid at the bottom portion of the bypass duct.

18. The method as claimed in claim 12, wherein exposing the change-phase fluid to heat exchange with the first coolant and the second coolant comprises exposing the change-phase fluid to heat exchange with the first coolant and the second coolant in a common reservoir of the change-phase fluid.

19. The method as claimed in claim 12, wherein the change-phase fluid absorbs heat from at least two of a group including an auxiliary gearbox, a buffer air cooler, an air cooled oil cooler, and an integrated drive generator.

20. A cooling system for a gas turbine engine comprising:
    a closed circuit containing a change-phase fluid, the closed circuit being without motive force, the closed circuit having at least one cooling exchanger integrated inside a bypass duct wall and around a bypass duct, the bypass duct wall being annular, the at least one cooling exchanger extending from a top portion to a bottom portion of the bypass duct wall, the at least one cooling exchanger configured to be exposed to a flow of cooling air for the change-phase fluid to release heat to the cooling air, and
    a plurality of heat exchangers in heat exchange relation with the change-phase fluid in the closed circuit, the plurality of heat exchangers including at least a first heat exchanger configured to receive a first coolant from a first engine system for the change-phase fluid to absorb heat from the first coolant, and a second heat exchanger configured to receive a second coolant from a second engine system for the change-phase fluid to absorb heat from the second coolant,
    wherein the system is configured so that the change-phase fluid at least partially vaporizes when absorbing heat from at least one of the first coolant and the second coolant and at least partially condenses when releasing heat to the cooling air.

* * * * *